United States Patent
Park et al.

(10) Patent No.: US 9,263,725 B2
(45) Date of Patent: Feb. 16, 2016

(54) SECONDARY BATTERY CASE AND METHOD FOR MANUFACTURING SECONDARY BATTERY

(71) Applicant: LG CHEM, LTD., Seoul (KR)

(72) Inventors: Sin Young Park, Daejeon (KR); Jeoung Soo Kim, Daejeon (KR); Dong Sub Lee, Daejeon (KR); Sang Bong Nam, Daejeon (KR); Hang Seob Yoon, Daejeon (KR); Hyang Mok Lee, Daejeon (KR); Dong Hee Seo, Daejeon (KR); Hyun Kyung Ko, Daejeon (KR); Sang Jin Woo, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 14/283,625

(22) Filed: May 21, 2014

(65) Prior Publication Data

US 2015/0089799 A1 Apr. 2, 2015

Related U.S. Application Data

(63) Continuation of application No. PCT/KR2014/002299, filed on Mar. 19, 2014.

(30) Foreign Application Priority Data

Sep. 30, 2013 (KR) .................. 10-2013-0116827

(51) Int. Cl.
*H01M 10/04* (2006.01)
*H01M 2/36* (2006.01)

(52) U.S. Cl.
CPC .............. *H01M 2/365* (2013.01); *H01M 10/04* (2013.01); *Y10T 29/4911* (2015.01)

(58) Field of Classification Search
CPC .............................. H01M 2/365; H01M 10/04
USPC .......................................... 29/623.2; 429/185
See application file for complete search history.

(56) References Cited

U.S. PATENT DOCUMENTS

| | | | |
|---|---|---|---|
| 2011/0052978 A1* | 3/2011 | Lee et al. ...................... | 429/185 |
| 2013/0216876 A1 | 8/2013 | Kim et al. | |

FOREIGN PATENT DOCUMENTS

| | | |
|---|---|---|
| JP | 4-66052 U | 6/1992 |
| JP | 11-135082 A | 5/1999 |

(Continued)

OTHER PUBLICATIONS

Machine translation of KR 10-1141049, obtained Jun. 17, 2015.*

*Primary Examiner* — Nicholas P D'Aniello
(74) *Attorney, Agent, or Firm* — Birch, Stewart, Kolasch & Birch, LLP

(57) ABSTRACT

Provided are a secondary battery case and a method for manufacturing a secondary battery. The secondary battery case includes a can accommodating an electrode assembly and a top cap sealing an upper opening of the can. The top cap includes a top plate sealing the upper opening of the can, a filling hole passing through the top plate to fill an electrolyte into the can, and a protrusion protruding from the top plate on an upper portion of the filling hole. The protrusion is press-fitted into the filling hole to seal the filling hole. According to the present invention, the protrusion may protrude from the top plate. Thus, the protrusion may be press-fitted into the filling hole and thus broken to seal the filling hole. Therefore, the member for sealing the filling hole may be integrated with the top plate to reduce manufacturing costs and simplify a manufacturing process.

8 Claims, 4 Drawing Sheets

(56) References Cited

FOREIGN PATENT DOCUMENTS

| JP | 11-154506 A | 6/1999 |
| JP | 2003-257414 A | 9/2003 |
| JP | 3738544 B2 | 1/2006 |
| JP | 2006-196394 A | 7/2006 |
| KR | 10-2006-0037624 A | 5/2006 |
| KR | 10-2012-0036389 A | 4/2012 |
| KR | 10-1141049 B1 | 5/2012 |

\* cited by examiner

SECONDARY BATTERY CASE AND METHOD FOR MANUFACTURING SECONDARY BATTERY

CROSS REFERENCE TO RELATED APPLICATIONS

This application is a continuation of PCT International Application No. PCT/KR2014/002299 filed on Mar. 19, 2014, which claims priority under 35 U.S.C 119(a) to Application No. 10-2013-0116827 filed on Sep. 30, 2013 in the Republic of Korea, all of which are hereby expressly incorporated by reference into the present application.

TECHNICAL FIELD

The present invention relates to a secondary battery case and a method for manufacturing a secondary battery, and more particularly, to a secondary battery case in which a member for sealing a filling hole is integrated with a top plate to reduce manufacturing costs and simply a manufacturing process and a method for manufacturing a secondary battery.

BACKGROUND ART

In general, secondary batteries are chargeable and dischargeable, unlike primary batteries that are not chargeable. Recently, high-output secondary batteries using a non-aqueous electrolyte having high-energy density are being developed. In a case of a low-capacity battery in which one battery cell is packaged in a pack shape, the low-capacity battery may be used in portable small electronic devices such as mobile phones, notebook computers, camcorders, and the like. It large-capacity power, such as power for driving motors of electric vehicles, is needed, a plurality of battery cells are connected in series or parallel to each other to constitute a large-capacity secondary battery package.

FIG. 1 is an exploded perspective view of a secondary battery. As illustrated in FIG. 1, a secondary battery includes an electrode assembly 2, a can 1 for accommodating the electrode assembly 2 therein, and a top cap for sealing an upper portion of the can 1. A separate having a sheet shape is disposed between a cathode having a sheet shape and an anode having a sheet shape. In this state, the cathode, the separator, and the anode are wound, and anode and cathode terminals are provided to protrude, thereby manufacturing the electrode assembly 2. The can 1 for accommodating the electrode assembly 2 may be provided as a plate that is formed of an aluminum alloy.

The top cap may be assembled with an upper portion of the can 1 to seal the upper portion of the can 1 that is opened to accommodate the electrode assembly 2. The top cap includes a top plate 110 and an insulator 7 disposed between the can 1 and the top plate 110 and formed of a plastic material.

FIG. 2 is a schematic view of the top plate 110. As illustrated in FIG. 2, a filling hole 120 through which an electrolyte is filled is defined in one side of the top plate 110 to pass through the top plate 110. The electrolyte is injected into the can 1 through the filling hole 120.

After the electrolyte is injected through the filling hole 120, the filling hole 120 is sealed. FIGS. 3 and 4 are schematic views illustrating a process of sealing the filling hole according to the related art. As illustrated in FIGS. 3 and 4, a separate metal ball 130 is provided. In the related art, to sealing the filling hole 120, the separate metal ball 130 is used. That is a physical force may be applied to the metal ball 130 to press-fit the metal ball 130 into the filling hole 120. As described above, the metal ball 130 may be only press-fitted through the physical force to primarily seal the filling hole 120, or additional laser welding may be performed after the metal ball 130 is press-fitted to secondarily seal the filling hole 120. Thereafter, epoxy may be additionally applied to an upper portion of the portion at which the metal ball 130 is press-fitted to finally seal the filling hole 120.

However, in the method of sealing the filling hole according to the related art, since the separate metal ball 130 is needed, manufacturing costs may increase, and manufacturing process may be complicated.

DISCLOSURE OF THE INVENTION

Technical Problem

To solve the above-described limitations, the present invention provides a secondary battery case that is capable of reducing manufacturing costs and simplifying a manufacturing process and a method for manufacturing a secondary battery.

Technical Solution

According to an aspect of the present invention, there is provided a secondary battery case including: a can accommodating an electrode assembly; and a top cap sealing an upper opening of the can, wherein the top cap includes: a top plate sealing the upper opening of the can; a filling hole passing through the top plate to fill an electrolyte into the can; and a protrusion protruding from the top plate on an upper portion of the filling hole, and the protrusion is press-fitted into the filling hole to seal the filling hole.

The protrusion may protrude from the top plate toward the inside of the filling hole on the upper portion of the filling hole and be broken from the top plate.

The protrusion may extend upward from the top plate and have an inclination surface that is inclined toward a side opposite to the filling hole, and when the protrusion is broken, the protrusion may be slid into the filling hole by the inclination surface.

The protrusion may include: a first protrusion; and a second protrusion spaced a predetermined distance from the first protrusion to face the first protrusion, the second protrusion defining a passage, which communicates with the filling hole, together with the first protrusion.

The sum of an upper sectional area of the first protrusion and an upper sectional area of the second protrusion may be greater than a sectional area of the filling hole.

Advantageous Effects

As described above, according to the secondary battery case and the method for manufacturing the secondary battery according to the present invention, the member for sealing the filling hole may be integrated with the top plate to reduce the manufacturing costs and simplify the manufacturing process.

MODE FOR CARRYING OUT THE INVENTION

Hereinafter, the present invention will be described with reference to the accompanying drawings. A secondary battery case according to the present invention includes a can for accommodating an electrode assembly and a top cap for sealing an upper opening of the can.

The top can includes a top plate 10 for sealing the upper opening of the can, a filling hole 20 passing through the top plate 10 to fill an electrolyte into the can, and a protrusion 30 protruding from the top plate 10 on an upper portion of the filling hole 20.

Figure 1:
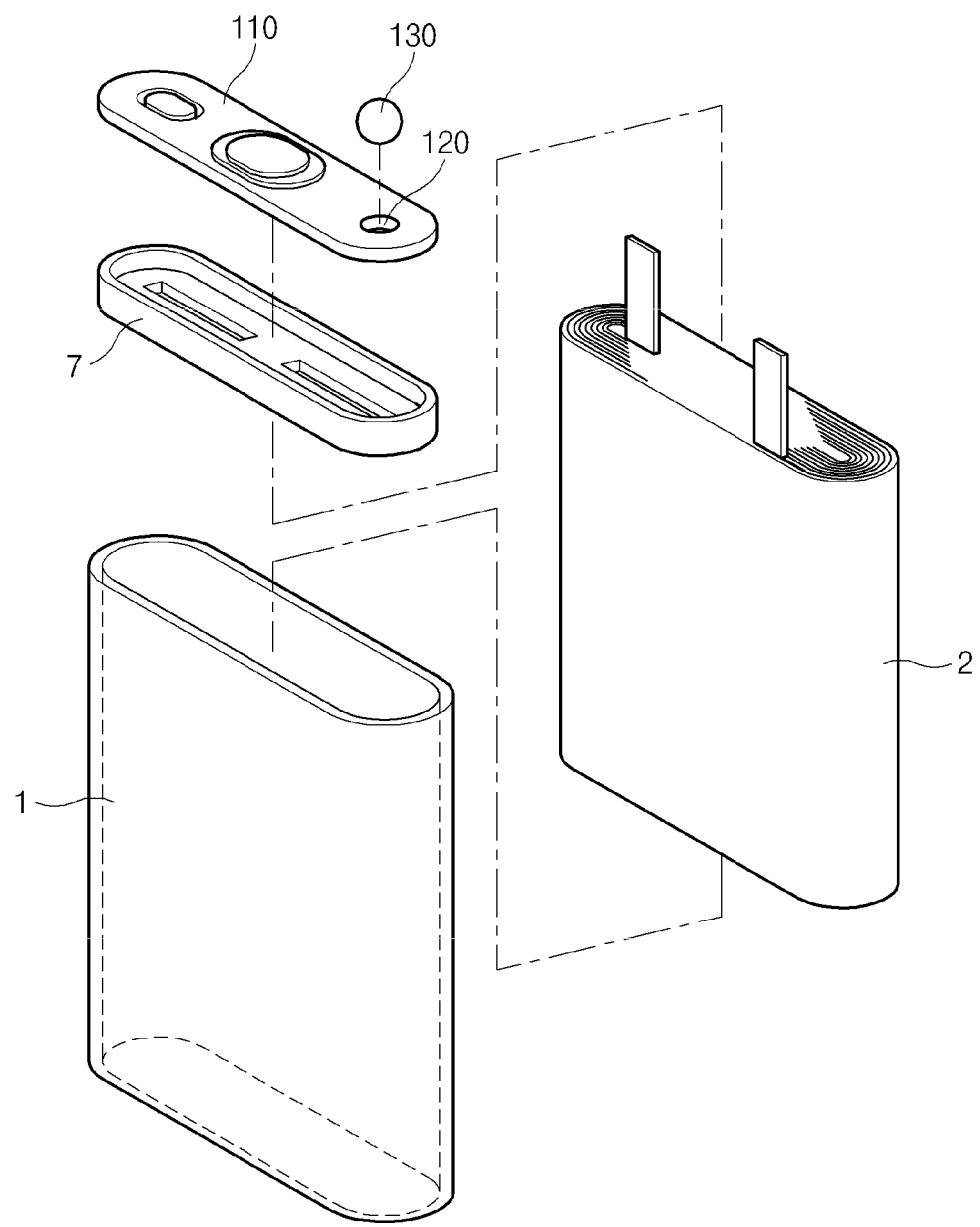
FIG. 1 is an exploded view of a secondary battery according to a related art.
Figure 2:
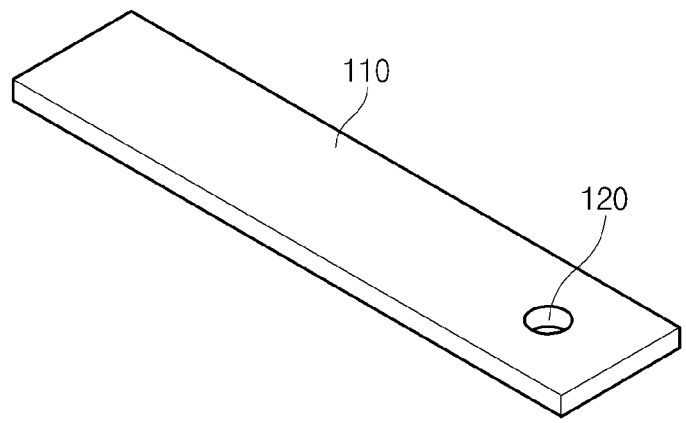
FIG. 2 is a schematic view of the to plate according to the related art.
Figure 3:
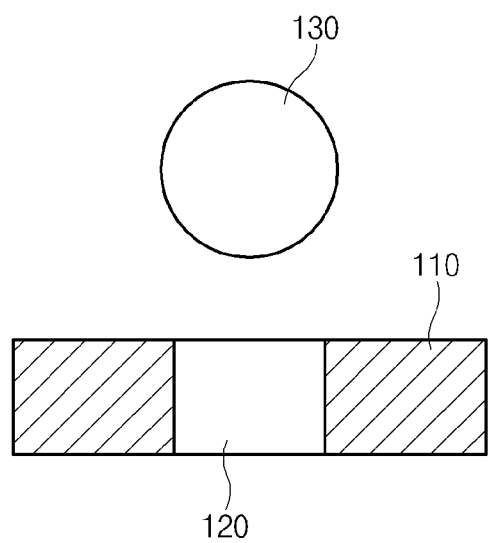
FIGS. 3 and 4 are schematic views illustrating process of sealing a filling hole according to the related art.
Figure 4:
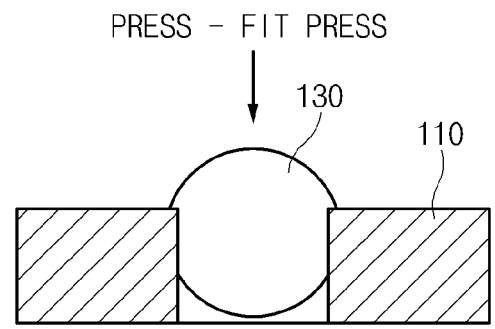
Figure 5:
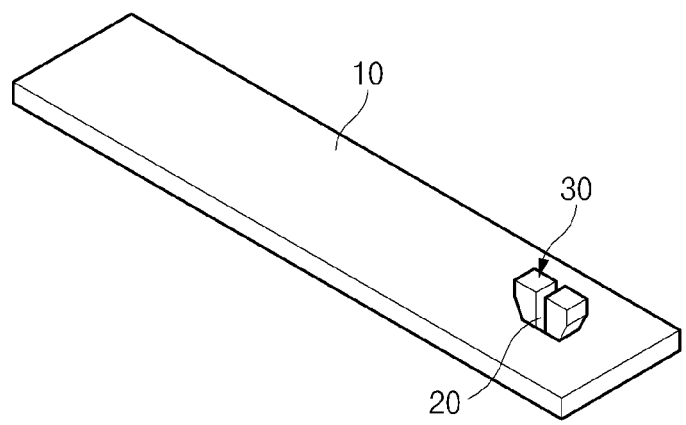
FIG. 5 is a schematic view of a top plate according to the present invention.
Figure 6:
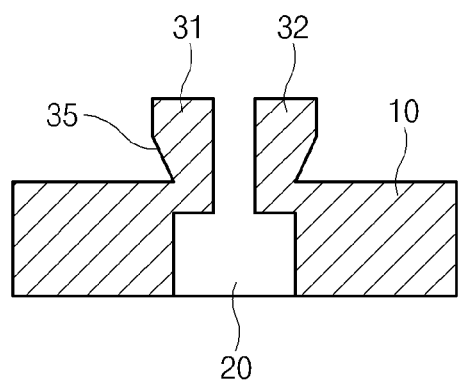
FIGS. 6 and 7 are schematic views illustrating a process of sealing a filling hole according to the present invention.
Figure 7:
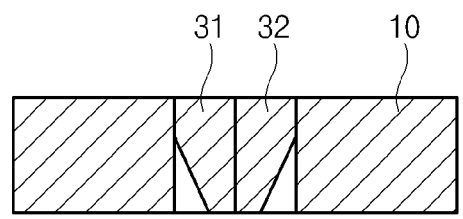

FIG. 5 is a schematic view of the top plate 10 according to the present invention, and FIGS. 6 and 7 are schematic views illustrating a process of sealing the filling hole according to the present invention. As illustrated in FIGS. 5 to 7, the filling hole 20 may be defined in one side of the top plate 10 to pass through the top plate 10, and the protrusion 30 may protrude from the tap plate 10 on the upper portion of the filling hole 20.

The protrusion 30 may be integrated with the top plate 10, or a separate member may be attached to the top plate 10. The protrusion 30 includes a first protrusion 31 and a second protrusion 32. Each of the first and second protrusions 31 and 32 may protrude from the top plate 10 toward the inside of the filling hole 20. Thus, when a physical force is applied, the first and second protrusions 31 and 32 may be broken from the top plate 10 toward the inside of the filling hole 20.

The first and second protrusions 31 and 32 may be symmetrically disposed to face each other with respect to the filling hole 20. Here, the second protrusion 32 may be spaced a predetermined distance from the first protrusion 31 to form a passage communicating with the filling hole 20. That is, the first and second protrusions 31 and 32 may not be configured to completely finish the filing hole 20 before being broken from the top plate 10. That is, the first and second protrusions 31 and 32 may be spaced a predetermined distance from each other so that the passage communicating with the filling hole 20 to inject the electrolyte into the filling hole 20.

Each of the first and second protrusions 31 and 32 may extend upward from the top plate 10 and have an inclination surface 35. Here, the inclination surface 35 may be inclined toward a side opposite to the filling hole 20. That is, the inclination surface 35 may be inclined downward from the protrusion 30 toward the filling hole 20. Thus, when the protrusion 30 is broken, the protrusion 30 may be slid into the filling hole 20 by the inclination surface 35. Here, the inclination surface 35 of the protrusion 30 may not start from the uppermost portion of the protrusion 30, but start from a position that is spaced a predetermined distance from the uppermost portion of the protrusion. This is done for a reason in which, when the protrusion 30 is broken to seal the filling hole 20, the upper portion of the filling hole 20 is closely attached to an inner surface of the filling hole 20 by a predetermined length due to the inclination surface 35 to prevent a sealing force from being reduced.

Also, in the first and second protrusions 31 and 32, the sum of an upper sectional area of the first protrusion 31 and an upper sectional area of the second protrusion 32 may be greater than a sectional area of the filling hole 20. This is done for a reason in which the first and second protrusions 31 and 32 have an area greater than the sectional area of the filling hole 20 to increase internal stress, thereby improving the internal sealing force.

A method for manufacturing the secondary battery including the above-described components will be described. The method for manufacturing the secondary battery according to the present invention includes an electrode assembly mounting process for mounting an electrode assembly inside a can, a can sealing process for sealing an upper opening of the can, an electrolyte filling process for filling an electrolyte into the can through a filling hole 20, and a filling hole sealing process for press-fitting protrusions 30 into the filling hole 20 to seal the filling hole 20. Prior to descriptions, in the method for manufacturing the secondary battery according to the present invention, detailed descriptions with respect to the same process when compared to the method for manufacturing the secondary battery according to the related art will be omitted.

The electrolyte filling process may be a process for injecting the electrolyte into the can by using an electrolyte injection nozzle not shown). Here, the electrolyte injection nozzle (not shown) may cover all the protrusions 30 and couple the protrusions to each other to align centers of the filling hole 20 and the electrolyte injection nozzle (not shown) with each other, thereby preventing a filing property from being deteriorated by the protrusions 30.

After the electrolyte is injected into the can through the electrolyte filling process, the filling hole sealing process is performed to seal the filling hole 20. Here, a physical force may be applied to the protrusions 30 protruding from a tap plate 10 toward the inside of the filling hole 20 by using a device such as a press, and thus the protrusions 30 may be broken from the top plate 10. As described above, since each of the protrusions 30 are inclined downward from an upper portion thereof toward the filling hole 20, the protrusions 30 may be slid along an inclination surface 35 into the filling hole 20 when the protrusions 30 are broken. Facing surfaces of the first and second protrusion 31 and 32, which are slid into the filling hole 20 may be closely attached to each other, and opposite surfaces may be closely attached to an inner surface of the filling hole 20 to seal the filling hole 20.

After the filling hole sealing process as described above, an epoxy coating process for applying epoxy onto top surfaces of the protrusions 30 may be further performed to improve a sealing force for the filling hole 20. Also, after the filling hole sealing process, circumferences of the top surfaces of the protrusions 30 may be welded to the top plate 10 to further improve the sealing force of the protrusions 30. Alternatively, all the above-described two processes may be performed.

Accordingly, the scope of the present invention is defined by the appended claims rather than the foregoing description and the exemplary embodiments described therein. Various modifications made within the meaning of an equivalent of the claims of the invention and within the claims are to be regarded to be in the scope of the present invention.

The invention claimed is:

1. A secondary battery case comprising:
a can accommodating an electrode assembly; and
a top cap sealing an upper opening of the can, wherein the top cap comprises:
   a top plate sealing the upper opening of the can;
   a filling hole passing through the top plate to fill an electrolyte into the can; and
   a protrusion protruding from the top plate on an upper portion of the filling hole, and the protrusion being configured to be press-fitted into the filling hole to seal the filling hole, wherein the protrusion protrudes from the top plate toward the inside of the filling hole on the upper portion of the filling hole and is configured to be broken from the top plate, wherein the protrusion extends upward from the top plate to form an inclination surface that extends gradually away from the filling hole toward a direction opposite to the filling hole, and wherein the protrusion has one end in contact with an edge of the filling hole, wherein a width of the one end of the protrusion is smaller than a width of an opposite end of the protrusion.

2. The secondary battery case of claim 1, wherein the protrusion comprises:
   a first protrusion; and
   a second protrusion spaced a predetermined distance from the first protrusion to face the first protrusion, the second protrusion defining a passage, which communicates with the filling hole, together with the first protrusion.

3. The secondary battery case of claim 2, wherein the sum of an upper sectional area of the first protrusion and an upper sectional area of the second protrusion is greater than a sectional area of the filling hole.

4. A method for manufacturing a secondary battery using the secondary battery case of claim 1, the method comprising:
   an electrode assembly mounting process mounting the electrode assembly inside the can;
   the top cap;
   an electrolyte filling process filling the electrolyte into the can through the filling hole; and
   a filling hole sealing process press-fitting the protrusion into the filling hole to seal the filling hole.

5. The method of claim 4, wherein the protrusion protrudes from the top plate toward the inside of the filling hole on the upper portion of the filling hole and is broken from the top plate.

6. The method of claim 5,
   wherein, when the protrusion is broken, the protrusion is slid into the filling hole by the inclination surface.

7. The method of claim 4, further comprising an epoxy coating process applying epoxy onto a top surface of the protrusion after the filling hole sealing process.

8. The method of claim 4, further comprising a protrusion welding process welding a circumference of a top surface of the protrusion to the top plate after the filling hole sealing process.

* * * * *